United States Patent

L'Huillier

[15] 3,688,955
[45] Sept. 5, 1972

[54] CHARACTER-READING APPARATUS INCORPORATING ELECTRONIC SCANNING CIRCUITRY

[72] Inventor: Jacques L'Huillier, Longjumeau, France

[73] Assignee: Compagnie Generale D'Automatisme, Paris, France

[22] Filed: Sept. 17, 1970

[21] Appl. No.: 73,050

[30] Foreign Application Priority Data

Nov. 24, 1969 France..................6940396

[52] U.S. Cl...........................................235/61.11 F, 179/100.2 B, 340/146.3 Z, 340/146.3 AC, 235/61.12 N

[51] Int. Cl.........G06k 7/14, G06k 19/06, G06k 9/13

[58] Field of Search.........340/146.3 Z, 146.3 AC, 146.3 SY; 235/61.11 E, 61.11 F, 92 R; 250/219 D; 179/100.2 B

[56] References Cited

UNITED STATES PATENTS

| | | | |
|---|---|---|---|
| 3,309,667 | 3/1967 | Feissel | 340/146.3 Z |
| 3,286,233 | 11/1966 | Lesueur | 340/146.3 Z |
| 3,346,845 | 10/1967 | Fomenko | 340/146.3 AC |
| 3,354,432 | 11/1967 | Lamb | 340/146.3 Z |
| R26,744 | 12/1969 | Perotto | 340/146.3 Z |
| 3,295,105 | 12/1966 | Gray | 340/146.3 H |
| 2,948,470 | 8/1960 | Berkley | 235/92 R |
| 3,181,059 | 4/1965 | Mohnkern | 179/100.2 B |

*Primary Examiner*—Maynard R. Wilbur
*Assistant Examiner*—Robert M. Kilgore
*Attorney*—Craig, Antonelli & Hill

[57] ABSTRACT

Device for scanning coded characters composed of elements such as dashes, points, etc., arranged along parallel lines, which device uses an electronic camera tube whose scanning direction coincides with the direction of the said parallel lines. The information supplied by the said electronic tube is decoded and stored in logic circuits. The said device is also capable of scanning magnetic-type information and is in particular designed for the automatic identification of objects.

10 Claims, 6 Drawing Figures

INVENTOR
JACQUES L'HUILLIER
BY Craig, Antonelli, Stewart & Hill
ATTORNEYS

CHARACTER-READING APPARATUS INCORPORATING ELECTRONIC SCANNING CIRCUITRY

The present invention concerns apparatus for reading characters composed of character elements arranged on parallel base lines so as to permit the identification of each character according to a logical code.

These characters may be letters, numbers or symbols, and the character elements are generally dashes or dots arranged in accordance with the logical code.

For example, the French company Compagnie des Machines Bull has designed a group of characters known as type CMC7characters. 7 are composed of dashes arranged on parallel base lines perpendicular to the lines along which words incorporating the characters are written. The spacing between adjacent base lines can have one of two values, referred to hereinafter as small and large spacings. The combination of spacing values for a particular character permits the identification of the character according to a binary code.

In accordance with the invention, apparatus for reading characters composed of character elements arranged on parallel base lines so as to permit the identification of each character according to a logical code, includes: a viewing arrangement, incorporating an electronic scanning system, adapted to view an array of characters to be read and arranged to detect the presence on each scan line of a character element and to provide output signals significant of the presence or absence of such characters on each scan line; control circuitry for the viewing arrangement adapted to provide scan lines extending parallel to the base lines of the characters; and analyzer circuitry connected to receive the viewing arrangement output signals and to evaluate therefrom data representative of the characters.

This data is suitably transferred to memory circuitry, and may then be transferred to data processing circuitry for further investigation.

The control circuitry for the viewing arrangement preferably comprises circuitry for modifying the scanning direction in response to the detection of non-coincidence of the character base line direction and an initially selected scanning direction.

For reading simultaneously several lines of characters for which the base lines extend perpendicularly of the character lines so that more than one character may be situated on each scanning line, line switching circuitry is preferably connected to receive the output of the viewing arrangement and is arranged to switch the output at appropriate moments in a scanning cycle between respective analyzer circuits each corresponding to a character line.

For reading simultaneously several lines of characters for which the base lines extend parallel to the character lines, column switching circuitry may be connected to receive the output of the viewing arrangement and arranged to switch the output at appropriate moments in a scanning cycle between respective analyzer circuits each corresponding to a character column extending perpendicular to the character lines.

In many applications, in order to keep the information recorded in the characters secret, the characters may be recorded magnetically so that they are invisible to the eye or optical viewing arrangements.

For reading characters recorded magnetically, a plate is suitably provided before the viewing arrangement and includes a pair of transparent plates between which is situated a thin layer of finely divided magnetizable material.

At least one of the transparent plates is preferably a magnifying lens.

The invention will now be described in more detail, by way of examples only, with reference to the accompanying partly diagrammatic drawings, in which.

Figure 1:
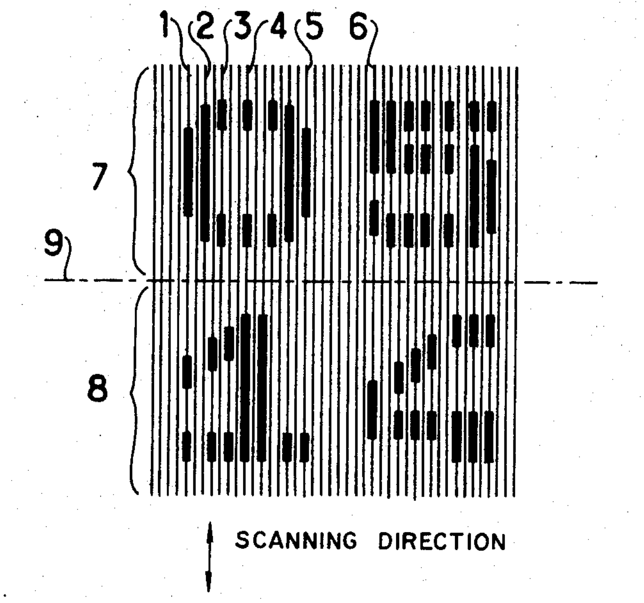
FIG. 1 shows one form of character and scanning lines of apparatus for reading the characters.

Referring to FIG. 1, a coded message consists of four numbers, zero and five on a first line and one and four on a second line. Each character is one of the above-mentioned CMC7 series, and is composed of vertical dashes arranged along parallel base lines which in the figure are vertical. The spacing between adjacent base lines may have one of two values, referred to as the small and large values. The analysis of the positions of the spacings and their values, that is to say whether they are small or large, allows the identification of each character.

Figure 2:
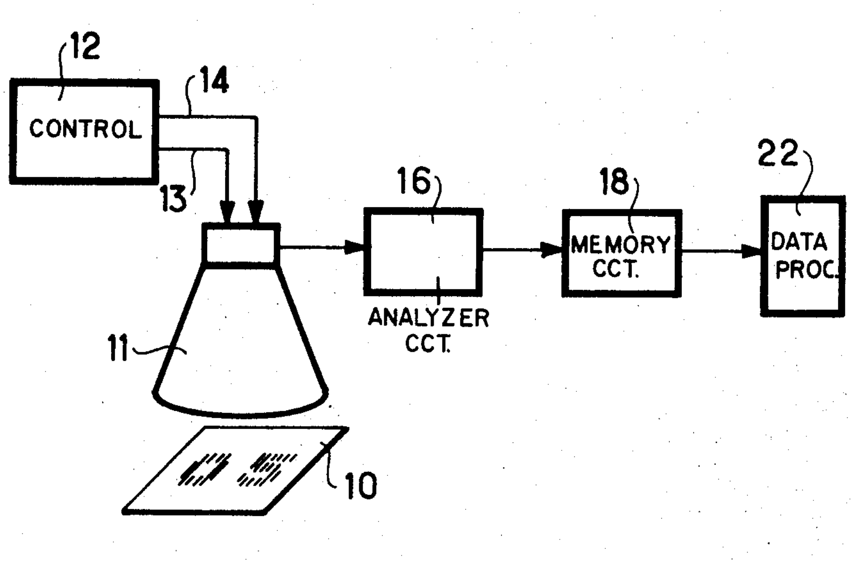
FIG. 2 is a block diagram of a first form of character reading apparatus.

Referring to FIG. 2, a sheet carrying characters to be read is presented to a viewing arrangement in the form of a cathode ray tube 11 such as a "VIDICON" tube. In FIG. 2, only the first line of characters of FIG. 1 is shown.

The tube 11 is connected to control circuitry 12, through two outputs 13 and 14. Output 13 controls the scanning of the tube, and output 14 provides signals for modifying the scanning direction in response to the detection of non-coincidence of the character base line direction and an initially selected scanning direction. Such scanning line correction circuitry is described in our copending application Ser. No. 50,173 filed June 26, 1970, now abandoned, hereby mentioned by way of reference.

The output signals of the tube 11 are applied to analyzer circuitry 16, whence they are transferred to memory circuitry 18. The output of memory circuitry 18 is connected to processing circuitry 22 of any appropriate form, such as a display panel or control circuitry arranged to control operation of some system in accordance with the information embodied in the characters, for example.

The operation of the apparatus will now be described referring to both FIGS. 1 and 2.

The tube 11 is arranged to provide an output signal when a scanning line encounters a character element.

In FIG. 1, the vertical lines represent the scanning lines, and it will be seen that the first scanning line to encounter a character element is that referenced 1.

The corresponding output signal from the tube 11 signals the beginning of the first character, in this case the zero. The next scanning line does not encounter a character element. The next scanning line to encounter an element is that referenced 2. When the spacing between adjacent base lines, and consequently adjacent character elements is small, as for example between the elements scanned on lines 1 and 2, one scanning line producing no output signal will be sandwiched between two scanning lines producing output signals. When the adjacent character elements have the large spacing, as is the case of the elements scanned on lines 3 and 4, two scanning lines producing no output signals are sandwiched between two signal-producing lines.

Thus, a count of the number of successive scanning lines producing no output signal from the tube 11 provides a measure of the intervals or spacings between successive character elements. To increase the precision and resolution of this process, a finer raster of scanning lines may be used, in which case a small spacing corresponds to a number of scanning lines without output signals less than a preselected number N, a large spacing corresponding to a number of signal-less scanning lines exceeding N. Further more, a limit M is defined and when the number of signal-less scanning lines exceeds this limit, it is clear that one character has finished and this space corresponds to that between successive characters. For example, in the relatively coarse resolution example of FIG. 1, there are seven scanning lines between the last signal-producing line 5 of the zero and the first signal-producing line 6 of the five.

Figure 3:
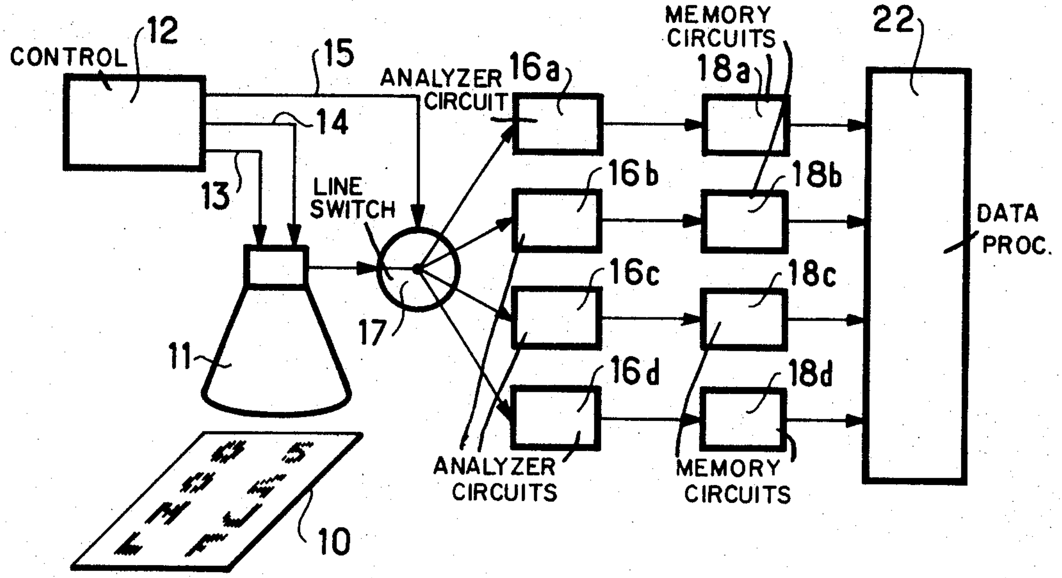
FIG. 3 is a block diagram of a second form of apparatus, for reading simultaneously several lines of characters.

A second form of the apparatus is shown in FIG. 3 and is arranged to read simultaneously several lines of characters for which the base lines extend perpendicularly of the character lines so that more than one character may be situated on each scanning line. Each scanning line crosses in succession all the lines of characters. The output signals from tube 11 must be assigned to respective analyzer circuits, each corresponding to one character line. To this end, line switching circuitry 17 is connected to receive the output of the tube 11 and is arranged to switch the output at appropriate moments in a scanning cycle between respective analyzer circuits **16*a* to 16*d***.

The line switching circuitry is controlled by timing pulses from the control circuitry 12 over an output 15, these pulses defining the appropriate moments in the scanning cycle. These timing pulses are at a multiple of the scanning frequency and each pulse is synchronized with the passage of the scanning line between successive character lines. Referring back to FIG. 1, the characters zero and five lie on a first character line 7 separated by a chain-dotted line 9 from a second character line 8 on which lie the characters one and four.

Each of the analyzer circuits **16*a* to 16*d* is connected to a respective memory circuit 18*a* to 18*d*, all these memory circuits having their outputs connected to common processing circuitry 22. Each of the combinations 16*a*, 18*a* to 16*d*, 18*d* is equivalent to the combination 16, 18 of FIG. 2**, and corresponds to one line of characters of the coded message.

Referring again to FIG. 2, when scanning covers a single line of characters, the control circuitry 12 controls the scanning and as soon as an output signal is provided by the tube 11, the circuit 16 counts the number of scanning lines providing no output signal from the tube. This count is stopped at the appearance of the next output signal from the tube 11 and is translated into a binary code digit. For example, a small spacing can be represented by binary zero, and a large spacing by binary one. This digit is transferred into a shift register forming a memory. When the count exceeds the upper limit M, signifying the end of a character, the ensemble of binary digits corresponding to the character is transferred as a whole into a memory. This cycle is then repeated for the next character.

Referring to FIG. 3, when the characters are arranged on several character lines, each scanning line successively explores each line of characters. It is therefore necessary to apportion the output signals of the tube 11 according to the character lines. This is done by the control circuit 12 which controls the line switching circuitry 17 over the output 15 so that the binary digits corresponding to the first character line are handled by circuits **16*a* and 18*a*, those of the second line by circuits 16*d* an 18*d***, and so on.

Figure 4:
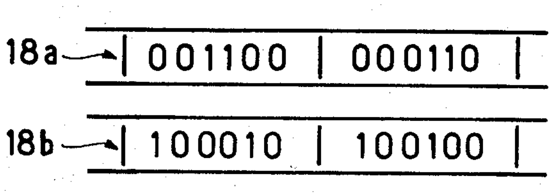
FIG. 4 shows the content of a memory register of the apparatus.

Referring now to FIG. 4, the binary numbers stored in the shift registers of circuits **18*a* and 18*b*, after reading of the characters shown in FIG. 1**, are 001100 and 000110 representing respectively the zero and the five, and 100010 and 100100 representing respectively the one and four.

Figure 5:
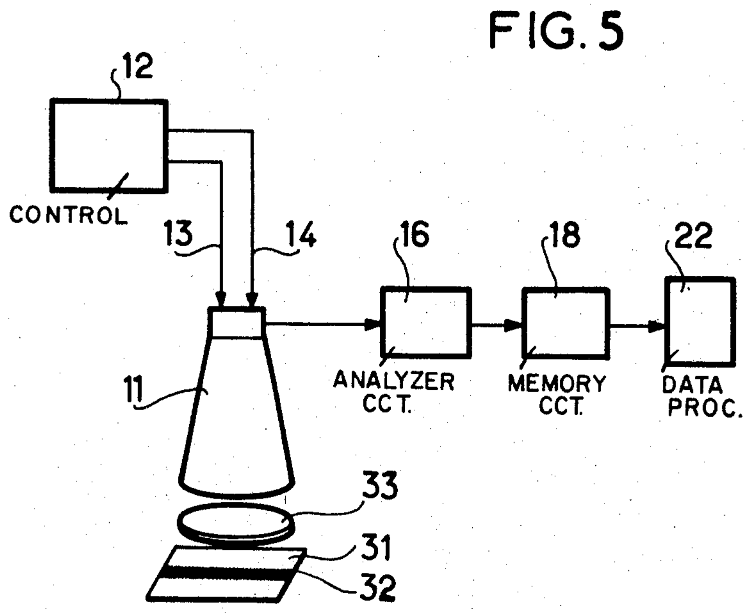
FIG. 5 is a block diagram of a third form of apparatus, for reading characters recorded magnetically.
Figure 6:
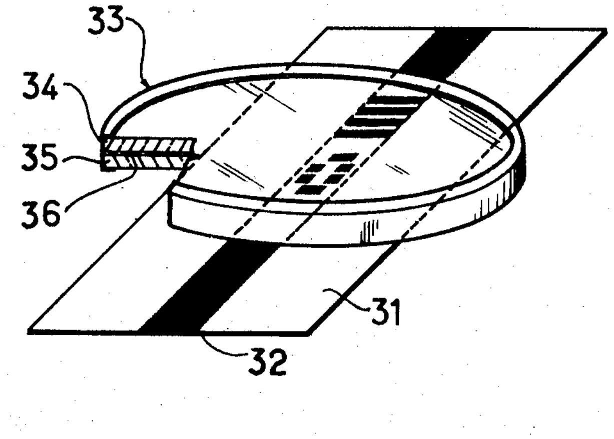
FIG. 6 shows part of the apparatus of FIG. 5 in more detail and to a larger scale.

The apparatus shown in FIG. 5 is adapted to read characters recorded magnetically on a support 31 provided with a magnetizable zone 32. The apparatus includes a window 33, shown in more detail and to a larger scale in FIG. 6, including a pair of transparent plates 34, 35 between which is situated a thin layer 36 of a finely divided magnetizable powder.

When this window is placed close to the magnetizable zone 32, a concentration of the powder is produced above the magnetized portions, with a corresponding thinning of the powder over the unmagnetized portions. The powder thus assumes an arrangement of concentrated and unconcentrated zones with the same configurations as the magnetized and unmagnetized portions respectively of the zone 32. Thus the characters recorded in this zone 32 are reproduced in the thin layer of powder 36. This pattern in the powder is scanned by the tube 11 controlled as before by control circuitry 12 over outputs 13 and 14. The output signals of the tube 11 are applied to analyzer circuitry 16, memory circuitry 18 and processing circuitry 22.

In the examples so far described, the characters are composed of dashes perpendicular to the character lines. The apparatus is equally suitable for use with characters composed of dashes parallel to the character lines, in which case the scanning will be carried out parallel to these character lines. For reading simultaneously several lines of characters for which the base lines extend parallel to the character lines, column switching circuitry (not shown) is connected to receive the output of the output of the viewing arrangement and is arranged to switch the output at appropriate moments in a scanning cycle between respective analyzer circuits each corresponding to a character column extending perpendicularly to the character lines. Apart from this difference, the apparatus and its operation are closely analogous to those already described.

It will be appreciated that the invention is not limited to use with characters of the CMC7 series as described, but is suitable for reading a wide variety of characters composed of character elements arranged to permit identification of each character according to a logical code.

Apparatus such as described may be used advantageously as an interface between printed or magnetically recorded information and electronic handling or display units. A particular advantage is that no precise positioning of the recorded information relative to the reading apparatus is required.

What is claimed is:

1. Apparatus for reading an array of coded characters each composed of linear elements arranged on selected parallel regularly spaced baselines disposed perpendicular to said array, each character being identifiable base lines the sequence of distances between the linear elements forming said character, comprising:

- detecting and viewing means including a radiation pickup device and an electronic scanning system for viewing an array of characters successively along each of said base lines to detect the presence on each scan line of said linear elements and to provide output signals significant of the presence of absence of such character elements on each respective scan line;
- control circuit means connected to said detecting and viewing means for controlling said scanning so that said scan lines are parallel to and coincide with said base lines; and
- analyzer means connected to receive the output signals form said detecting and viewing means for evaluating therefrom data representative of the characters which are scanned.

2. Apparatus for reading characters as defined in claim 1, wherein said analyzer means includes counter means responsive to said output signals for counting the number of scanning lines providing no character element and logic means for generating one binary indication upon detection of a first number of consecutive lines having no character element and a second binary indication upon detection of a second number of consecutive lines having no character element.

3. Apparatus for reading characters as defined in claim 2, wherein said analyzer means further includes a shift register for storing the binary designations generated by said logic means for each character which is scanned.

4. Apparatus for reading characters as defined in claim 3, wherein said analyzer means further includes a memory connected to said shift register for storing the binary designations relating to a plurality of characters and said logic means further including means for shifting the data in said shift register to said memory upon detection of a third number of consecutive lines having no character element.

5. Apparatus for reading characters as defined in claim 4, wherein a plurality of analyzer means are provided, and further including column switching means connected to said viewing means for switching said output signals at predetermined times in a scanning cycle between the respective analyzer means so that each analyzer means receives the output signals corresponding to a respective one of a plurality of character columns being scanned.

6. Apparatus for reading characters as defined in claim 5, wherein said control circuit means includes time pulse generating means for generating timing pulses to control said column switching means.

7. Apparatus for reading an array of coded characters each composed of linear elements arranged on selected parallel regularly spaced base lines disposed perpendicular to said array, each character being identifiable by the sequence of distances between the linear elements forming said character, comprising:

- detecting and viewing means including a radiation pickup device and an electronic scanning system for viewing an array of characters successively along each of said base lines to detect the presence on each scan line of said character elements and to provide output signals significant of the presence or absence of such character elements on each respective scan line;
- control circuit means connected to said detecting and viewing means for controlling said scanning so that said scan lines are perpendicular to said base lines;
- a plurality of analyzer means for evaluating from said output signals data representative of the characters which are scanned; and
- switching means connected to said detecting and viewing means for switching said output signals at predetermined times in a scanning cycle between the respective analyzer means so that each analyzer means receives the output signals corresponding to a respective one of a plurality of characters being scanned.

8. Apparatus for reading characters as defined in claim 7, wherein each analyzer means includes counter means responsive to said output signals for counting the number of scanning lines providing no character element and logic means for generating one binary indication upon detection of a first number of consecutive lines having no character element and a second binary indication upon detection of a second number of consecutive lines having no character element.

9. Apparatus for reading characters as defined in claim 8, wherein each analyzer means further includes a shift register for storing the binary designations generated by said logic means for each character which is scanned.

10. Apparatus for reading characters as defined in claim 9, wherein each analyzer means further includes a memory connected to said shift register for storing the binary designations relating to a plurality of characters and said logic means further including means for shifting the data in said shift register to said memory upon detection of a third number of consecutive lines having no character element.

* * * * *